(12) United States Patent
Galota et al.

(10) Patent No.: US 9,168,646 B2
(45) Date of Patent: Oct. 27, 2015

(54) CALIBRATED CLAMPING DEVICE

(75) Inventors: Vincenzo Galota, Turin (IT); Sabato Inserra Imparato, Gragnano (IT); Pasquale De Bonis, San Giovanni Rotondo (IT); Gianni Iagulli, San Severo (IT)

(73) Assignee: Alenia Aermacchi S.p.A., Venegono Superiore, Varese (IT)

( * ) Notice: Subject to any disclaimer, the term of this patent is extended or adjusted under 35 U.S.C. 154(b) by 861 days.

(21) Appl. No.: 13/450,912

(22) Filed: Apr. 19, 2012

(65) Prior Publication Data
US 2012/0266422 A1 Oct. 25, 2012

(30) Foreign Application Priority Data

Apr. 22, 2011 (IT) .............................. TO2011A0358

(51) Int. Cl.
| | |
|---|---|
| B23P 19/04 | (2006.01) |
| B25B 31/00 | (2006.01) |
| F16B 29/00 | (2006.01) |
| B25B 5/06 | (2006.01) |
| B25B 5/10 | (2006.01) |
| F16B 5/02 | (2006.01) |
| F16B 5/06 | (2006.01) |
| F16B 5/00 | (2006.01) |
| F16B 2/00 | (2006.01) |
| F16B 43/00 | (2006.01) |
| F16B 23/00 | (2006.01) |

(52) U.S. Cl.
CPC ................. *B25B 31/005* (2013.01); *B25B 5/06* (2013.01); *B25B 5/10* (2013.01); *F16B 5/0266* (2013.01); *F16B 5/0642* (2013.01); *F16B 29/00* (2013.01); *F16B 2/00* (2013.01); *F16B 5/00* (2013.01); *F16B 23/00* (2013.01); *F16B 43/00* (2013.01); *Y10T 24/44974* (2015.01)

(58) Field of Classification Search
USPC .......................................................... 29/255
See application file for complete search history.

(56) References Cited

U.S. PATENT DOCUMENTS 1,978,935 A * 10/1934 Douglas ....................... 411/80.2
2,398,644 A    4/1946 Johnson
(Continued)

FOREIGN PATENT DOCUMENTS

DE         200 08 784 U1    8/2000
DE     102006059232 B3 *  6/2008 ................ F16B 5/02
(Continued)

OTHER PUBLICATIONS

Italian Search Report for corresponding Italian Patent Application No. TO2011A000358 mailed Dec. 14, 2011.
(Continued)

*Primary Examiner* — Lee D Wilson
*Assistant Examiner* — Alvin Grant
(74) *Attorney, Agent, or Firm* — Merchant & Gould P.C.

(57) ABSTRACT

A straight threaded rod has three reference elements spaced apart from each other. A shoulder and a knob having a fourth reference element are screwed onto the rod. A spring is mounted on the rod between the knob and the shoulder. The rod is inserted through two axially aligned holes in two abutting pieces, with the shoulder bearing on a first surface of one of the two pieces. By adjusting the position of the shoulder and the knob along the rod it is possible to apply a calibrated clamping force to a pair of abutting pieces, regardless of the thickness of the pieces.

9 Claims, 1 Drawing Sheet

(56) References Cited

U.S. PATENT DOCUMENTS

| | | | |
|---|---|---|---|
| 3,152,375 A * | 10/1964 | Blakeley | 411/347 |
| 3,440,922 A * | 4/1969 | Cohen | 411/397 |
| 3,568,562 A | 3/1971 | Harwood | |
| 4,004,486 A * | 1/1977 | Schenk | 411/16 |
| 4,690,365 A * | 9/1987 | Miller et al. | 248/650 |
| 4,850,771 A * | 7/1989 | Hurd | 411/43 |
| 4,886,405 A * | 12/1989 | Blomberg | 411/16 |
| 4,930,962 A * | 6/1990 | Reynolds | 411/107 |
| 4,977,663 A * | 12/1990 | Hurd | 29/525.04 |
| 5,063,861 A | 11/1991 | Imogawa et al. | |
| 5,094,579 A * | 3/1992 | Johnson | 411/107 |
| 5,580,201 A * | 12/1996 | Brilmyer | 411/354 |
| 5,603,595 A * | 2/1997 | Nygren, Jr. | 411/14.5 |
| 5,785,449 A * | 7/1998 | DiBene | 403/343 |
| 6,102,610 A * | 8/2000 | Palusis et al. | 403/388 |
| 6,435,791 B1 * | 8/2002 | Bydalek | 411/428 |
| 6,644,903 B1 * | 11/2003 | Arand | 411/352 |
| 6,786,691 B2 * | 9/2004 | Alden, III | 411/371.2 |
| 6,899,503 B2 * | 5/2005 | Anderson et al. | 411/533 |
| 7,344,345 B2 * | 3/2008 | Aukzemas | 411/372 |
| 7,462,007 B2 * | 12/2008 | Sullivan et al. | 411/231 |
| 7,677,853 B2 * | 3/2010 | Donovan | 411/361 |
| 7,877,948 B2 * | 2/2011 | Davies | 52/506.05 |
| 8,777,535 B2 * | 7/2014 | Manahan | 411/166 |
| 2002/0154966 A1 * | 10/2002 | Stone et al. | 411/352 |

FOREIGN PATENT DOCUMENTS

| | | |
|---|---|---|
| FR | 2 650 880 A1 | 2/1991 |
| GB | 551 597 A | 3/1943 |
| SE | 54 812 C1 | 3/1921 |
| SU | 699 246 A1 | 11/1979 |

OTHER PUBLICATIONS

Extended European Search Report for corresponding European Patent Application No. 12164951.1 mailed Sep. 21, 2012.

* cited by examiner

CALIBRATED CLAMPING DEVICE

This application claims benefit of Serial No. TO2011A000358, filed 22 Apr. 2011 in Italy and which application is incorporated herein by reference. To the extent appropriate, a claim of priority is made to each of the above disclosed applications.

BACKGROUND OF THE INVENTION

The present invention relates to a clamping device capable of applying a calibrated clamping force for locking two pieces together temporarily.

In the aircraft construction industry it is often necessary to couple together two large pieces, each having an extensive surface which is positioned facing towards, and is clamped to, an extensive surface of the other piece, or a plurality of separate support surfaces, which are spaced apart, of the other piece. This necessity arises, for example, when carbon-resin components such as stiffened panels, spars, ribs, or the like have to be coupled to each other and/or to light alloy or titanium parts, where the coupling is particularly critical owing to the different degrees of finish of the coupling surfaces. The two pieces are initially brought together and positioned in a predetermined mutual coupling position, with the two corresponding surfaces abutting each other. The two pieces are then held together temporarily, by temporary coupling means, in a predetermined position substantially corresponding to the flight configuration in which the two pieces will subsequently be finally joined together. Before the two pieces are finally joined together, for example by means of rivets, threaded fasteners, or other special fastening members (such as Hi-Lok or Lockbolt fasteners), it is necessary to check for the presence of any gap (or empty space or void) between the facing surfaces of the two pieces, and measure its size, if present.

If there is a gap whose dimensions exceed certain tabulated values, the clamping process by which the two pieces are finally coupled will inevitably entail an unacceptable degree of forcing to bring the two pieces into direct contact, leading to the appearance of stresses caused by deformations created locally for the approach of the pieces. These stresses constitute a pre-loading which is added to the stresses to which the pieces are subjected in use. In extreme cases, if the coupling forces applied in the presence of a gap are excessive, fractures may occur in the pieces when an acceptable stress level is exceeded.

In order to avoid this, a solid filling insert (or "shim") has to be interposed between the facing surfaces of the two parts, to fill the gap in such a way that, when the two pieces are made to abut each other, they can be joined together without the generation of appreciable additional local deformation and stresses.

In order to manufacture an insert or shim having a variable thickness corresponding to the distances between the facing surfaces of the two pieces to be joined, the thickness of the void or gap between the pieces must be measured while the pieces are both in their natural, or non-deformed, position in which they are subsequently to be finally joined together.

In the aircraft industry, some manufacturers stipulate that the gap must be measured while the two pieces are temporarily held together, by the application of standard clamping forces at certain points; for example, it is specified that the forces must have an intensity of 5 lb (22.24 N) and must be applied at the positions of pairs of aligned holes formed in the two parts to be coupled, where each pair is separated from the other by an interval of one foot (0.305 m). For the application of these temporary retaining forces, use is made of through holes with diameters slightly smaller than those of the final holes into which the final fastening members (usually rivets or bolts) will be inserted.

SUMMARY OF THE INVENTION

The object of the invention is to apply a calibrated clamping force to hold in an abutting position the two pieces to be joined, without forcing them, during the step of measuring the gap for the purpose of making a shim to measure for interposition between the two pieces which can subsequently be joined together finally, without generating harmful deformations or stresses in the pieces. Another object of the invention is to provide a clamping device which is simple and economical to make, is composed of a small number of parts, and can enable a precise clamping force to be applied at a multiplicity of points.

BRIEF DESCRIPTION OF THE DRAWINGS

A preferred, but non-limiting, embodiment of the invention will now be described; reference should be made to the attached drawings, in which.

DETAILED DESCRIPTION OF THE DRAWINGS

Figure 1:
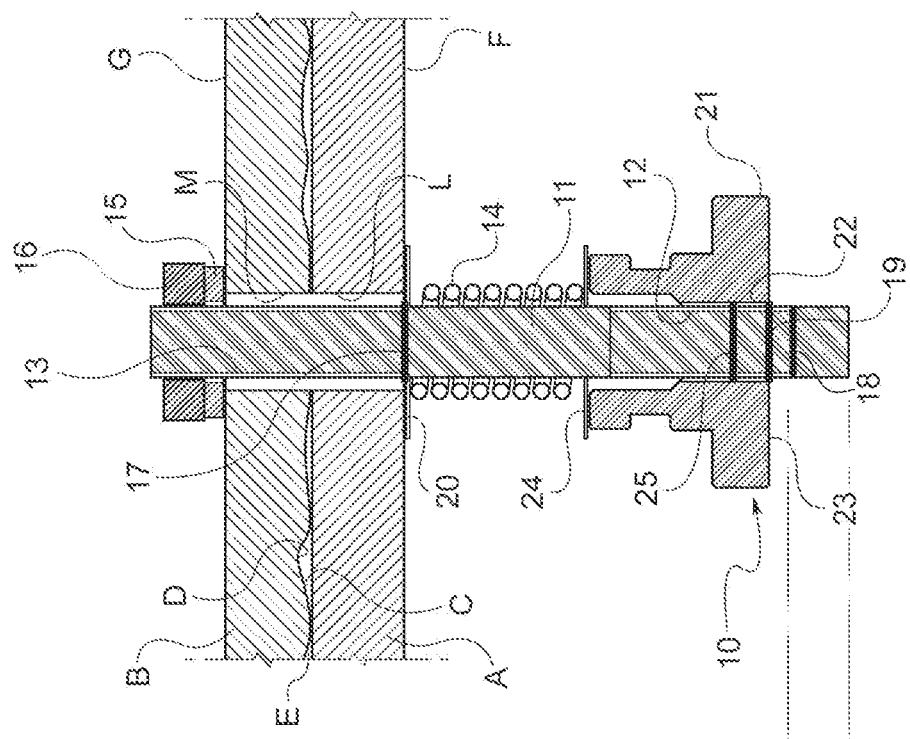
FIGS. 1 and 2 are sectional views providing a schematic illustration of a device according to the invention which clamps two pieces together.

With reference to FIG. 1 initially, a clamping device, indicated as a whole by the number 10, comprises a straight rod 11 on which threaded portions 12 and 13 are formed at locations spaced apart axially along the rod, these portions being located in opposite end areas in this example. A calibrated compression spring 14 is fitted on the rod 11, and a knob 21, a threaded nut 15, and preferably also a threaded locknut 16, are coupled by threading to the respective threaded portions 12 and 13. In an alternative embodiment (not shown), the rod 11 is threaded substantially over the whole of its length.

A and B indicate two pieces, in this example two panels or walls, to be joined together. The invention is not limited by the shape of the pieces to be joined; the reference to pieces shaped in the form of panels must not be interpreted as limiting the scope of the patent. The pieces A and B have respective facing surfaces C and D which, in the (illustrated) condition in which the pieces are abutting each other, create a void or gap E between them. The thickness of the gap must be measured at various points in order to make a solid filler insert or shim (not shown) which will be interposed between the facing surfaces. The shim, made to measure in order to copy the shape and dimensions of the gap exactly, enables the two pieces to be finally coupled by the application of clamping forces which, because of the interposition of the shim, will not cause appreciable deformation or stresses in the pieces.

The process for manufacturing the compensation insert or shim can be chosen from a range of modern rapid prototyping and manufacturing methods which are not relevant to the understanding of the invention, and which are not, therefore, described herein.

The axial length of the threaded rod 11 is conveniently chosen in such a way that it projects to a considerable extent from both of the opposite faces F, G of the two abutting pieces A, B. Throughout the present description and the following claims, the terms and expressions indicating positions and orientations such as "axial" and "transverse" are to be interpreted as relating to the longitudinal direction in which the threaded rod 11 extends. The rod 11 is inserted freely, with a transverse clearance, through two through holes L, M which are aligned, or substantially aligned, in an axial direction, and which have been formed in advance in the respective pieces A, B to be joined.

The rod 11 has a plurality (three, in this example) of clearly visible reference marks or elements 17, 18, 19, such as annular notches or projections or transverse coloured lines on the outside surface of the rod in positions spaced apart axially: these include a first reference element, in this example a circular line 17, and a second reference element 18, in this example a circular line. A further reference element, shown in an axially intermediate position between the first and the second, is indicated at 19. All the reference elements are contained in corresponding geometrical planes perpendicular to the axial direction and spaced apart from each other axially along the rod 11.

When the two pieces are abutting with the surfaces C and D in contact, the rod 11 is fitted into the aligned holes L, M until the first reference element 17 is brought to a position coplanar or flush with one of the outward facing surfaces of one of the two pieces, in this example the surface F of the piece A. Optionally, as in the illustrated example, a washer 20 can be fitted on the rod 11 at the level of the reference element 17.

This position of the rod is fixed by screwing the nut 15 onto the opposite end of the rod, which projects beyond the surface G of the piece B, until the nut abuts against the surface G. The nut is then locked in position by means of the locknut 16. The nut 15 forms a shoulder whose axial position is adjustable along the rod 11.

The spring 14 is axially interposed between the surface F (or the washer 20, if present) and the threaded knob 21, which is screwed onto the end described here as the "front" end of the threaded rod, until it contacts the spring 14 without compressing it. This initial condition, with the spring decompressed, is shown in FIG. 1. The front surface 23 of the knob 21 is aligned transversely with the zero load line 18, which has been marked on the rod 11 after a calibration operation carried out previously. In the condition shown in FIG. 1, the elastic compression load exerted by the spring between the front surface F and the knob 21 is zero; consequently, the clamping force applied to the two pieces A and B is also zero.

The number 24 indicates an optional washer interposed between the knob 21 and the spring 14. In the preferred embodiment, the threaded seat of the knob which is screwed onto the rod 11 is a cylindrical through cavity 22, which opens onto the surface 23 located on the face of the knob opposite the spring 14.

Figure 2:
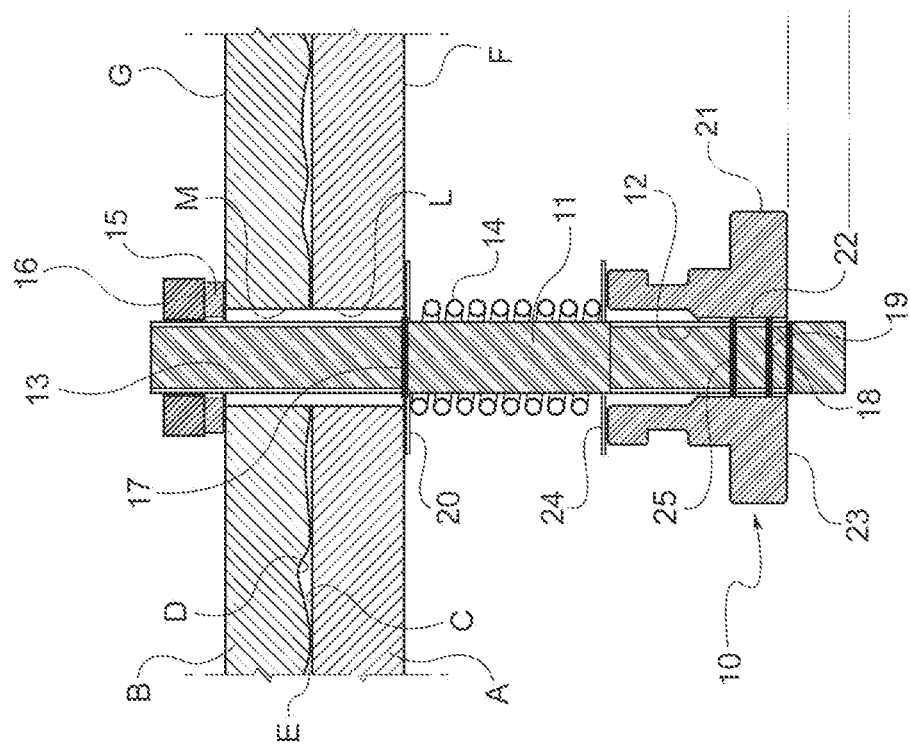

Starting from the zero load position, the knob 21 is screwed up, thus gradually compressing the spring 14, until the front surface 23 of the knob 21 is transversely aligned with the second reference line 19 provided on the threaded rod on the basis of a previous calibration. In this new position of the knob (FIG. 2), the spring 14 is compressed sufficiently to exert between the knob 21 and the surface F a predetermined load, for example 5 lb, which is also equal to the clamping force applied to the two pieces A and B.

If the knob 21 is screwed up further until its front surface 23 is brought to the position of the reference line 25 and kept in this position (not shown), the spring 14 applies a higher clamping load, for example 10 lb (44.48 N), to the two pieces A and B. The application of this higher clamping load is useful subsequently for the purpose of checking that the shim, prepared on the basis of the measurements made previously with the pre-loading of 5 lb, is actually matched to the gap, allowing for the specified tolerances.

When the condition of transverse alignment of the reference element 23 on the knob with one of the reference lines 18, 19 or 25 is reached, the operator knows which of the predetermined clamping forces is being applied to the two pieces, these forces being 0, 5, or 10 lb, depending on which reference line has been reached.

All the reference marks or elements on the bar 11 are applied after calibration operations, for which a dynamometer is preferably used.

Clearly, the same clamping device can be used to apply a predetermined precise clamping force, regardless of the thickness of the two parts to be joined and the gap between the two parts. This is because a threaded rod 11 of adequate length allows the device to operate with various thicknesses. The length of the rear portion of the threaded rod emerging from the combination of the nut 15 and locknut 16 varies inversely with the thickness. By adjusting the position of the rear opposing shoulder (represented by the nut in this example), in such a way that the first reference mark is coplanar with the front surface of the two pieces, it is possible to establish a "zero" reference position, and the predetermined clamping force can be applied starting from this position.

It is to be understood that the invention is not limited to the embodiment described and illustrated herein, which is to be considered as an example of the device; indeed, the invention can be modified in respect of the shapes, sizes, arrangements of parts, details of construction, and materials used. For example, the adjustable shoulder at the rear of the device could be of a type other than a nut and locknut. Alternatively, it is possible to use shoulder means such as elastic rings capable of clamping the rod and bearing against the rear surface G of the piece B. In yet another variant embodiment, the shoulder element which is adjustable along the rod can engage selectively in a series of notches formed along the rod. However, this variant does not allow for continuously variable adjustment of the "zero load" position, whereas such adjustment can be achieved by using a threaded nut, with the greatest possible precision. The choice of a shoulder in the form of a threaded nut is advantageous because it allows continuous fine adjustment of the axial position of the shoulder along the rod.

Additionally, the reference element formed by the knob may be different from the terminal surface 23. A reference element equivalent to this can be formed, for example, by a transverse line applied to a transparent window on the knob, such that the transverse alignment of the reference elements, and consequently the degree of elastic clamping force applied, can be ascertained visually. The appearance of the reference elements, which serve to identify the degree of compression of the spring, is not limiting on the invention.

What is claimed is:

1. A clamping device for applying a calibrated clamping force to a pair of abutting pieces, the device comprising, in combination:
   a straight threaded rod extending in an axial direction;
   at least a first, a second and a third visible reference element located on the rod and lying in planes perpendicular to said direction and axially spaced apart from one another along the rod;
   a shoulder selectively lockable in a plurality of axial positions along the rod;
   a threaded body threadedly coupled to the rod so as to allow the axial position of the body to be adjusted along the rod;
   a fourth visible reference element located on the threaded body and lying in a plane perpendicular to the axial direction;

an axially compressible elastic means mounted on the rod at a position axially interposed between the threaded body and the shoulder;

the clamping device being able to take at least two different working conditions:

a first, zero load condition, in which:
 the rod is inserted through two axially aligned holes in two abutting pieces,
 the shoulder abuts against a first surface of one of the two pieces,
 the first reference element is coplanar with a second surface of the other of the two abutting pieces, the second surface being located on a side opposite the first surface, and
 the threaded body is positioned along the rod in a first axial position in which the second and fourth reference elements are in the same plane perpendicular to the axial direction, and in this first axial position the elastic means is locked in a non-compressed state between the threaded body and the second surface of the piece; and a second condition of calibrated clamping, in which:
 the rod and the shoulder are positioned as in the first working condition;
 the threaded body is positioned along the rod in a second axial position such that the elastic means is compressed axially between the threaded body and the second surface of the piece,
 the third and fourth reference elements are in the same plane perpendicular to the axial direction, whereby the two pieces are clamped with a calibrated axial force between the shoulder and the elastic means.

2. A clamping device according to claim 1, wherein the third reference element is located on the rod at an axially intermediate position between the first reference element and the second reference element.

3. A clamping device according to claim 2, wherein the rod provides a fifth, visible reference element located at an axially intermediate position between the first reference element and the third reference element.

4. A clamping device according to claim 1, wherein the shoulder comprises a first threaded nut coupled by threading to the rod to allow adjustment of the axial position of the first nut along the rod.

5. A clamping device according to claim 4, wherein the shoulder further includes a second nut coupled by threading to the rod and adjacent to the first nut for locking the axial position of the first nut along the rod.

6. A clamping device according to claim 1, wherein the elastic means is a helical compression spring fitted on the rod.

7. A clamping device according to claim 1, wherein the reference elements on the rod include notches or annular reliefs or lines marked on the outside surface of the rod at axially spaced positions.

8. A clamping device according to claim 1, wherein the threaded body is a knob having a through, threaded cylindrical cavity screwed on the rod, and that the fourth reference element is defined by an outer surface of the knob on which the cavity opens.

9. A method of applying a calibrated clamping force to a pair of abutting pieces, the method including:

providing a clamping device according to claim 1, the clamping device including:
 a straight threaded rod extending in an axial direction;
 at least a first, a second and a third visible reference element located on the rod, lying in planes perpendicular to said direction and axially spaced apart from one another along the rod;
 a shoulder selectively lockable in a plurality of axial positions along the rod;
 a threaded body coupled by means of threading to the rod so as to allow the axial position of the body to be adjusted along the rod;
 a fourth visible reference element located on the threaded body and lying in a plane perpendicular to the axial direction;
 an axially compressible elastic means mounted on the rod at a position axially interposed between the threaded body and the shoulder;

b) providing two abutting pieces with respective, aligned through holes;

c) inserting the rod through the two holes;

d) adjusting the position of the shoulder along the rod so that the shoulder is abutting against a first surface of one of the two pieces and the first reference element is coplanar with a second surface of the other of the two abutting pieces, the second surface being located on a side opposite the first surface;

e) adjusting the position of the threaded body along the rod so as to bring the threaded body to a first axial position in which the second and fourth reference elements are in the same plane perpendicular to the axial direction, and in this first axial position the elastic means is locked in a non-compressed state between the threaded body and the second surface of the piece;

f) adjusting the position of the threaded body along the rod so as to bring the threaded body to a second axial position in which:
 the elastic means is axially compressed between the threaded body and the second surface of the piece;
 the third and fourth reference elements are in the same plane perpendicular to the axial direction, whereby the two pieces are clamped with a calibrated axial force between the shoulder and the elastic means.

\* \* \* \* \*